(12) United States Patent
Bunker

(10) Patent No.: US 10,731,472 B2
(45) Date of Patent: Aug. 4, 2020

(54) AIRFOIL WITH COOLING CIRCUIT

(71) Applicant: General Electric Company, Schenectady, NY (US)

(72) Inventor: Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 504 days.

(21) Appl. No.: 15/150,647

(22) Filed: May 10, 2016

(65) Prior Publication Data

US 2017/0328209 A1 Nov. 16, 2017

(51) Int. Cl.
*F01D 5/18* (2006.01)
*F01D 5/28* (2006.01)

(52) U.S. Cl.
CPC .............. *F01D 5/186* (2013.01); *F01D 5/187* (2013.01); *F01D 5/288* (2013.01); *F05D 2220/323* (2013.01); *F05D 2230/313* (2013.01); *F05D 2230/90* (2013.01); *F05D 2260/202* (2013.01); *F05D 2260/204* (2013.01); *F05D 2300/611* (2013.01)

(58) Field of Classification Search
CPC ........... F05D 2300/611; F05D 2260/20; F05D 2260/202; F05D 2260/204; F05D 2260/205; F05D 2260/221; F05D 2230/31; F05D 2230/311; F05D 2230/312; F05D 2230/313; F05D 2230/314; F05D 2230/90; F05D 2220/323; F01D 5/18; F01D 5/186; F01D 5/187; F01D 5/288

USPC .......................................................... 415/115
See application file for complete search history.

(56) References Cited

U.S. PATENT DOCUMENTS

| | | |
|---|---|---|
| 3,698,834 A | 10/1972 | Meginnis |
| 5,363,645 A | 11/1994 | Pellet |
| 5,383,766 A | 1/1995 | Przirembel et al. |
| 5,626,462 A | 5/1997 | Jackson et al. |
| 6,168,381 B1 * | 1/2001 | Reddy ..................... F01D 5/186 |
| | | 415/116 |
| 6,261,054 B1 | 7/2001 | Bunker et al. |
| 6,375,425 B1 | 4/2002 | Lee et al. |
| 6,443,700 B1 | 9/2002 | Grylls et al. |
| 6,461,107 B1 | 10/2002 | Lee et al. |
| 6,499,949 B2 | 12/2002 | Schafrik et al. |
| 6,511,762 B1 | 1/2003 | Lee et al. |
| 6,582,194 B1 | 6/2003 | Birkner et al. |
| 6,896,487 B2 | 5/2005 | Cunha et al. |
| 6,905,302 B2 | 6/2005 | Lee et al. |
| 6,932,571 B2 | 8/2005 | Cunha et al. |

(Continued)

OTHER PUBLICATIONS

Extended European Search Report and Opinion issued in connection with corresponding EP Application No. 17169293.2 dated Jul. 26, 2017.

(Continued)

*Primary Examiner* — Kenneth J Hansen
*Assistant Examiner* — Justin A Pruitt
(74) *Attorney, Agent, or Firm* — Charlotte C. Wilson; James W. Pemrick

(57) ABSTRACT

An airfoil for a turbine engine having an engine component including an air supply circuit coupled to a plurality of passages within the outer wall of the engine component where cooling air moves from the air supply circuit to an outer surface of the engine component through the passages.

18 Claims, 10 Drawing Sheets

(56) References Cited

U.S. PATENT DOCUMENTS

| | | | |
|---|---|---|---|
| 6,955,522 | B2 | 10/2005 | Cunha et al. |
| 7,097,426 | B2 | 8/2006 | Lee et al. |
| 7,137,776 | B2 | 11/2006 | Draper et al. |
| 7,219,074 | B2 | 5/2007 | Capek et al. |
| 7,311,498 | B2 | 12/2007 | Cunha et al. |
| 7,498,774 | B2 | 3/2009 | Ziegler et al. |
| 7,513,744 | B2 | 4/2009 | Cunha et al. |
| 7,553,131 | B2 | 6/2009 | Cunha et al. |
| 7,717,677 | B1 | 5/2010 | Liang |
| 7,775,768 | B2 | 8/2010 | Devore et al. |
| 7,837,441 | B2 | 11/2010 | Spanger et al. |
| 8,517,667 | B1 | 8/2013 | Liang |
| 8,586,179 | B1 | 11/2013 | Jacobsen et al. |
| 9,003,657 | B2 | 4/2015 | Bunker et al. |
| 2006/0222494 | A1* | 10/2006 | Liang ............ F01D 5/187 416/97 R |
| 2007/0280832 | A1* | 12/2007 | Liang ............ F01D 5/186 416/97 R |
| 2011/0259017 | A1* | 10/2011 | Lacy ............ F01D 5/186 60/806 |
| 2012/0111545 | A1 | 5/2012 | Bunker et al. |
| 2012/0171047 | A1* | 7/2012 | Itzel ............ F01D 5/18 416/97 R |
| 2012/0276308 | A1 | 11/2012 | Rebak et al. |
| 2013/0323078 | A1 | 12/2013 | Beattie et al. |
| 2014/0157792 | A1* | 6/2014 | Itzel ............ F01D 9/041 60/806 |
| 2014/0302278 | A1 | 10/2014 | Bunker |
| 2015/0034604 | A1 | 2/2015 | Subramanian et al. |
| 2015/0064019 | A1 | 3/2015 | Lacy et al. |
| 2015/0143792 | A1 | 5/2015 | Bunker |
| 2015/0184857 | A1 | 7/2015 | Cunha et al. |
| 2015/0321289 | A1 | 11/2015 | Bruck et al. |
| 2015/0377034 | A1 | 12/2015 | Quitter |

OTHER PUBLICATIONS

First Office Action and Search issued in connection with corresponding CN Application No. 201710325904.5 dated Dec. 18, 2018 (English Translation Not Available).

Office Action issued in connection with corresponding CA Application No. 2965239 dated Jun. 8, 2018.

* cited by examiner

AIRFOIL WITH COOLING CIRCUIT

BACKGROUND OF THE INVENTION

Turbine engines, and particularly gas or combustion turbine engines, are rotary engines that extract energy from a flow of combusted gases passing through the engine onto a multitude of rotating turbine blades. Turbine engines have been used for land and nautical locomotion and power generation, but are most commonly used for aeronautical applications such as for aircraft, including helicopters. In aircraft, turbine engines are used for propulsion of the aircraft. In terrestrial applications, turbine engines are often used for power generation.

Turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

An airfoil for a turbine engine, the airfoil comprising, an outer wall having an outer surface and an inner surface bounding an interior space, the outer wall defining a pressure side and a suction side extending axially between a leading edge and a trailing edge and extending radially between a root and a tip, at least one coating applied to the outer surface, multiple cooling circuits each comprising at least a wall sub-circuit and a skin sub-circuit, with the wall sub-circuit having a wall cooling passage provided within an interior of the outer wall, the skin sub-circuit having at least one channel formed in the outer surface and at least one hole passing through the coating to the channel, with the channel fluidly connected to the cooling passage, an air equalizing cavity fluidly coupled to at least one of the multiple cooling circuits from at least one of the root or tip, and at least one equalizing cavity located within the interior and fluidly coupling the multiple cooling circuits.

An engine component for a turbine engine, which generates a hot air flow, and provides a cooling fluid flow, the component comprising a wall separating the hot air flow from the cooling fluid flow and having a first surface along which the hot air flows in a hot flow path and a second surface facing the cooling fluid flow, at least one coating applied to the first surface, multiple cooling circuits each comprising at least a wall sub-circuit and a skin sub-circuit, with the wall sub-circuit having a wall cooling passage provided within an interior of the wall, the skin sub-circuit having at least one channel formed in the first surface and at least one hole passing through the coating to the channel, with the channel fluidly connected to the cooling passage, and at least one equalizing cavity fluidly coupling the multiple cooling circuits, wherein at least one of the multiple cooling circuits is fluidly coupled to the cooling fluid flow.

A method of cooling an airfoil comprising multiple cooling circuits having at least one wall sub-circuit and a skin sub-circuit, the method comprising serially passing cooling air from the wall sub-circuit to the skin sub-circuit for each of the multiple cooling circuits while equalizing the cooling air flow between the multiple cooling circuits.

DESCRIPTION OF EMBODIMENTS OF THE INVENTION

Figure 1:
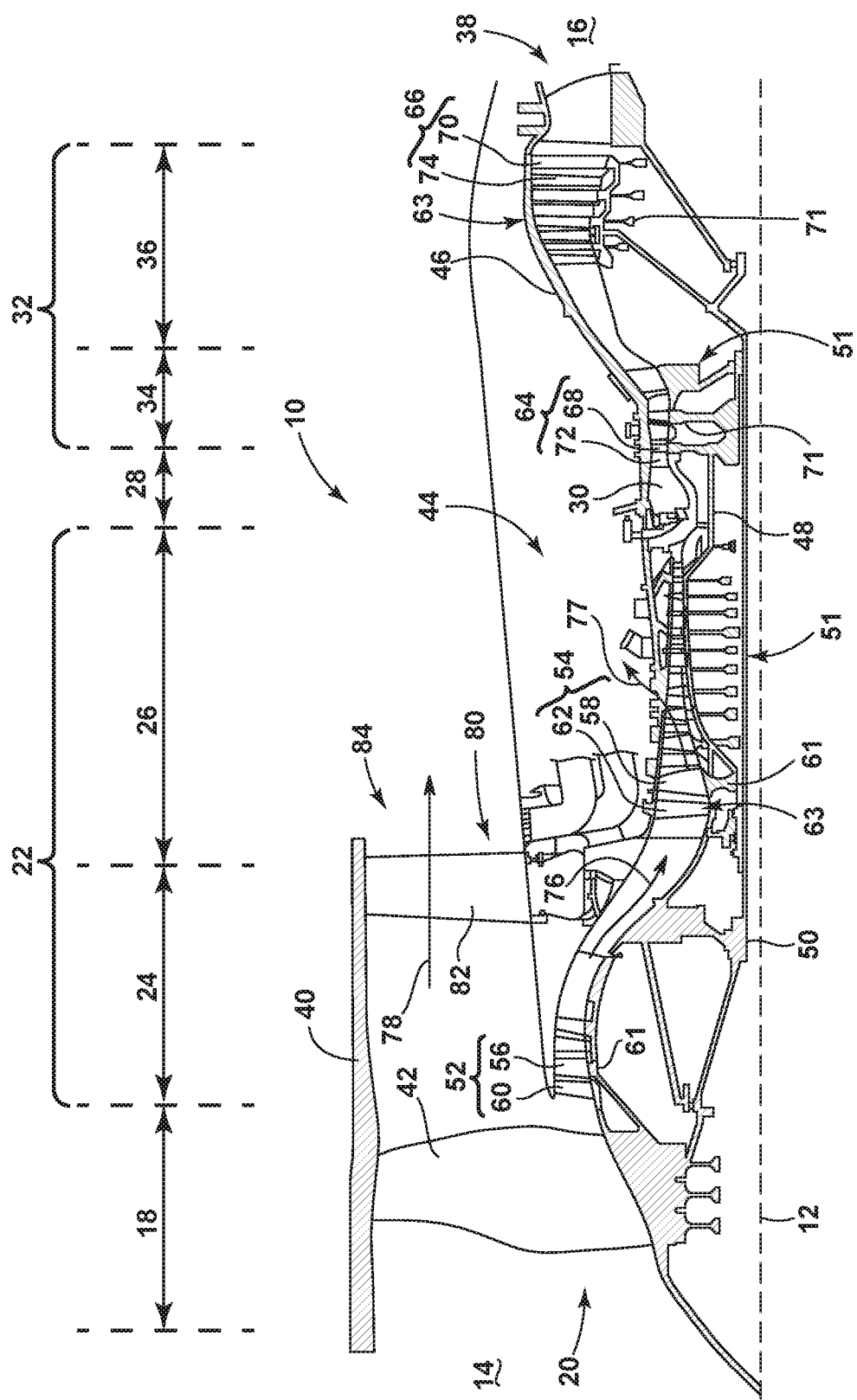
FIG. 1 is a schematic cross-sectional diagram of a turbine engine for an aircraft.

The described embodiments of the present invention are directed to an engine component for an engine having a cooling circuit comprising skin sub-circuits, wall sub-circuits, and equalizing cavities wherein one of the skin sub-circuits or wall sub-circuits is supplied with cooling air for cooling an outer surface of for example an airfoil. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates a hot air flow. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the air flow exiting the fan section 18 is split such that a portion of the air flow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized air flow 76 can be drawn from the compressor section 22 as bleed air 77. The bleed air 77 can be draw from the pressurized air flow 76 and provided to engine components requiring cooling. The temperature of pressurized air flow 76 entering the combustor 30 is significantly increased. As such, cooling provided by the bleed air 77 is necessary for operating of such engine components in the heightened temperature environments.

A remaining portion of the air flow 78 bypasses the LP compressor 24 and engine core 44 and exits the engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the air flow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
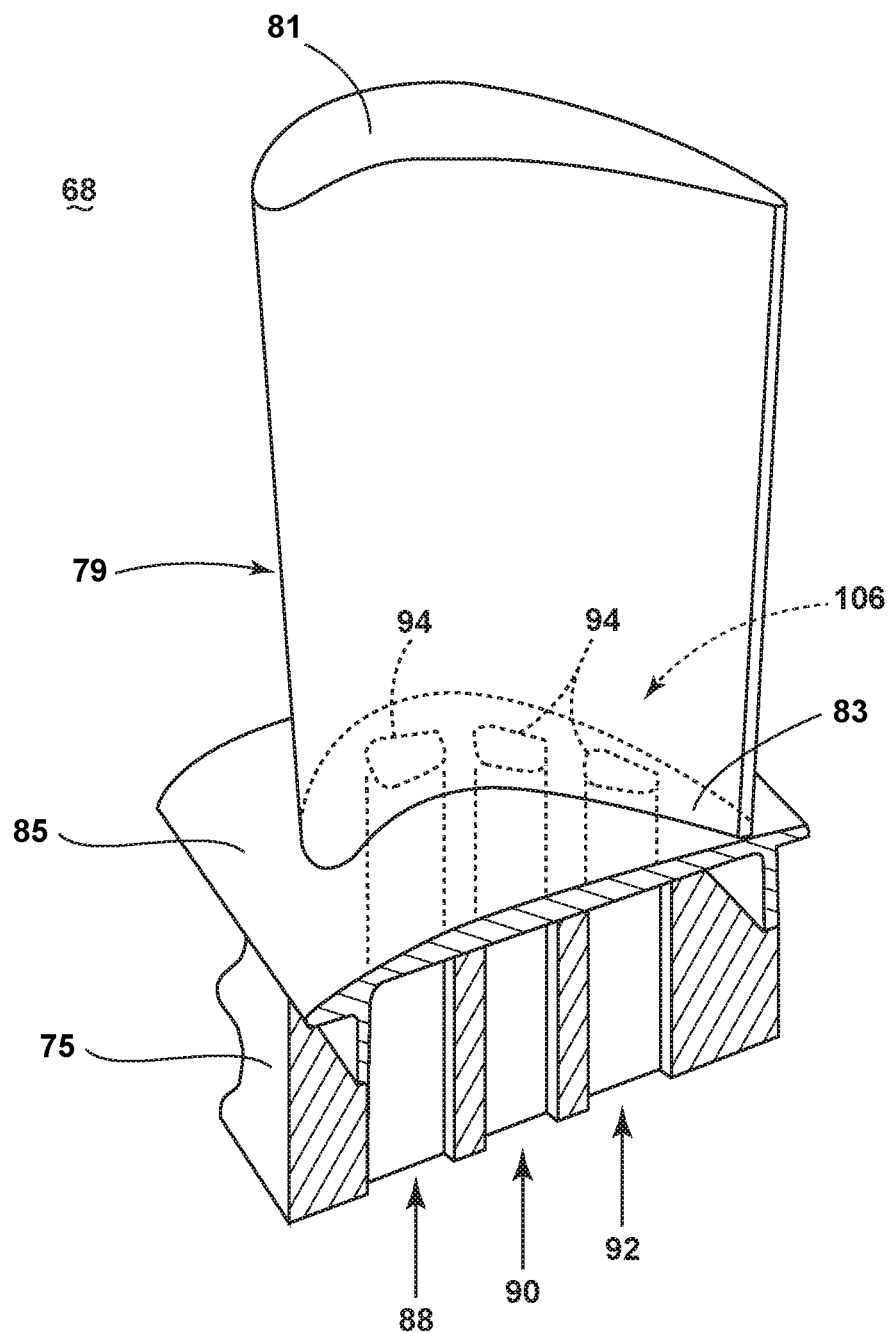
FIG. 2 is a perspective view of an engine component in the form of a turbine blade of the engine of FIG. 1 with cooling air inlet passages.

FIG. 2 is a perspective view of an engine component in the form of one of the turbine blades 68 of the engine 10 from FIG. 1. The turbine blade 68 includes a dovetail 75 and an airfoil 79. The airfoil 79 extends radially between a root 83 and a tip 81. The dovetail 75 further includes a platform 85 integral with the airfoil 79 at the root 83, which helps to radially contain the turbine air flow. The dovetail 75 can be configured to mount to a turbine rotor disk on the engine 10. The dovetail 75 comprises at least one inlet passage, exemplarily shown as a first inlet passage 88, a second inlet passage 90, and a third inlet passage 92, each extending through the dovetail 75 to provide internal fluid communication with the airfoil 79 at a passage outlet 94. The passage outlet 94 is fluidly coupled to multiple cooling circuits (FIG. 4), which can be at the root 83 as illustrated or at the tip 81 to define an air supply circuit 106, or at any other desired location. It should be appreciated that the dovetail 75 is shown in cross-section, such that the inlet passages 88, 90, 92 are housed within the body of the dovetail 75.

Figure 3:
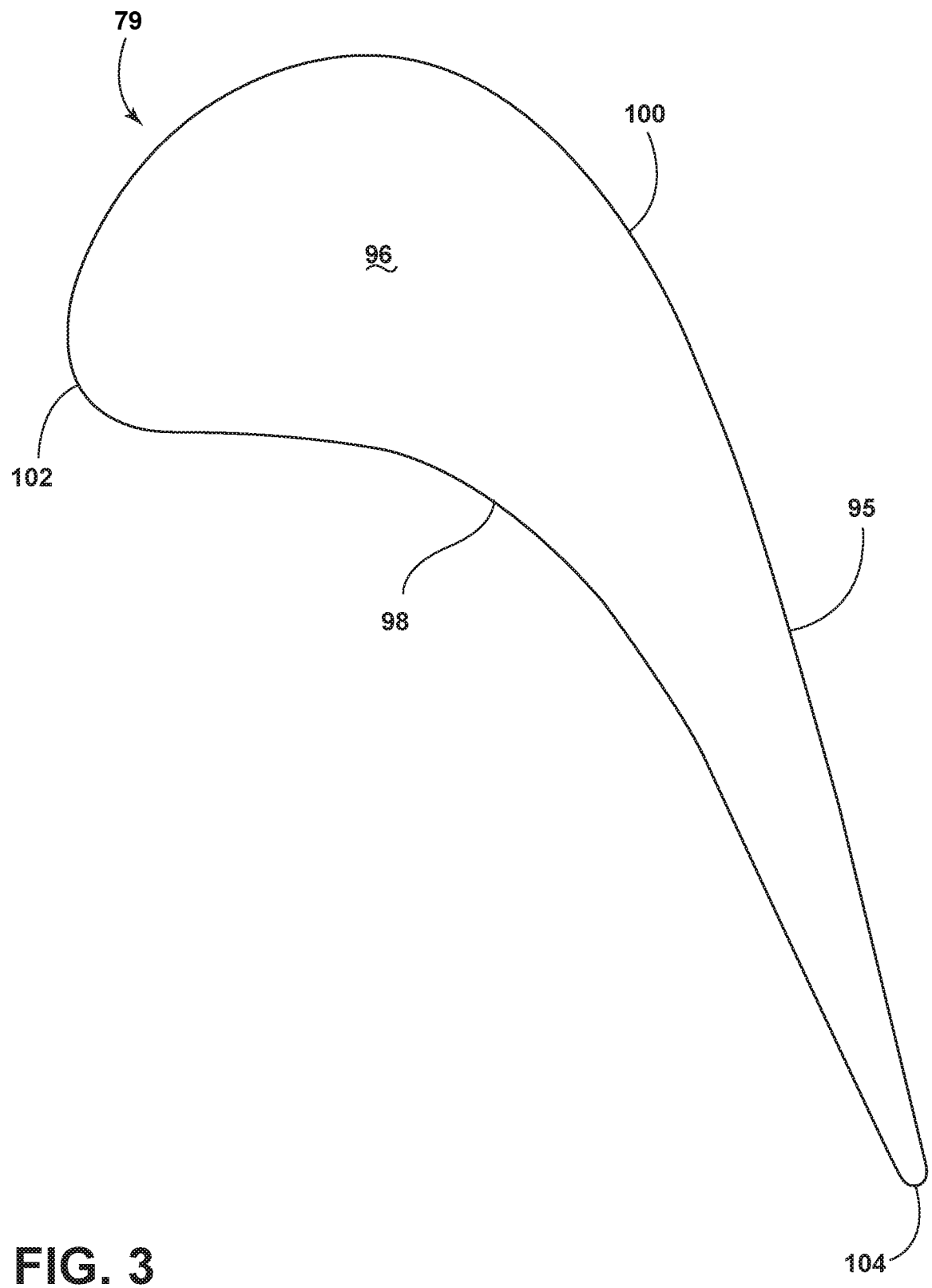
FIG. 3 is a schematic peripheral view of the airfoil of FIG. 2.

Turning to FIG. 3, the airfoil 79, shown in cross-section, comprises an outer wall 95 bounding an interior space 96 having a concave-shaped pressure side 98 and a convex-shaped suction side 100 that are joined together to define an airfoil cross section extending axially between a leading edge 102 and a trailing edge 104. The blade 68 rotates in a direction such that the pressure side 98 follows the suction side 100. Thus, as shown in FIG. 3, the airfoil 79 would rotate upward toward the top of the page.

Figure 4:
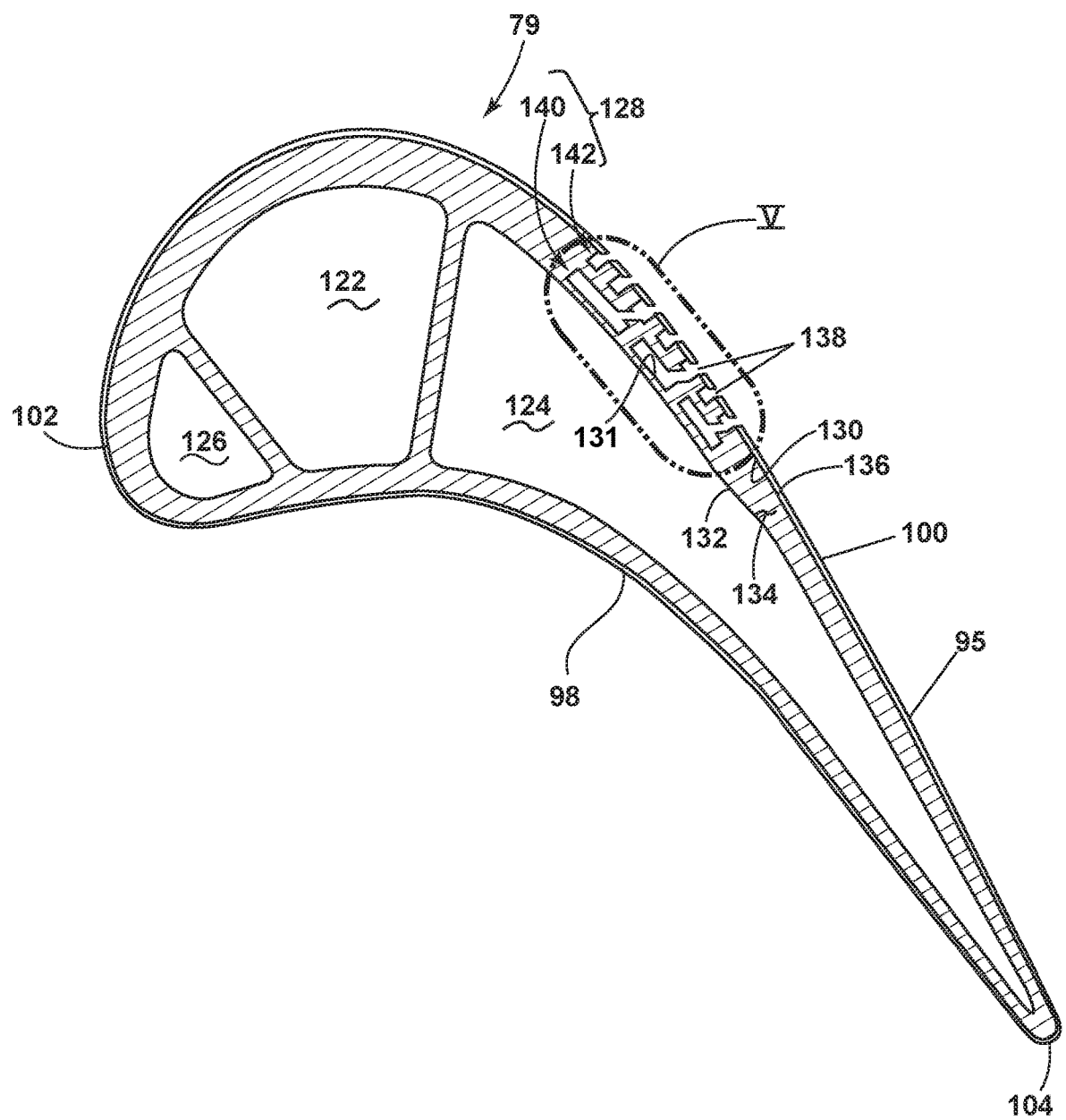
FIG. 4 is a cross sectional view of the airfoil of FIG. 2 and illustrating a plurality of internal passages.

Referring to FIG. 4, the interior space 96 can be divided into a plurality of internal equalizing cavities 122, 124, 126 that can be arranged in any formation within the interior space 96 and can extend from the root 83 to the tip 81. The equalizing cavities 122, 124, 126 are dedicated to providing equalizing for pressure differentials between multiple circuits 128 provided within the airfoil 79. In some embodiments the equalizing cavities 122, 124, 126 can be fluidly coupled to at least one of the inlet passages 88, 90, 92 where internal fluid communication is provided to at least one of the equalizing cavities 122, 124, 126 through the passage outlet 94.

It should be appreciated that the respective geometries of each individual equalizing cavity 122, 124, 126 within the airfoil 79 as shown is exemplary, and not meant to limit the airfoil 79 to the number of equalizing cavities, their geometries, dimensions, or positions as shown. Additionally the equalizing cavities 122, 124, 126 can be fluidly coupled to each other to provide additional internal fluid communication between adjacent equalizing cavities. Further, while three equalizing cavities are shown, there can be any number of equalizing cavities from one to multiple, for example.

The outer wall 95 comprises an outer surface 130 and an inner surface 132, which defines an interior 134 that is generally solid. At least one coating 136 is applied to the outer surface 130 where the coating 136 can include one or more layers comprising metallic, ceramic, or any other suitable material. The outer surface 130 and the at least one coating 136 define a "skin" for the airfoil. The outer wall 95, including the skin, separates a hot air flow H on a first surface 129 of the airfoil from a cooling fluid flow C along a second surface 131 and supplied to the supply circuits 122, 124, 126. The coating 136 can be formed by various known methods such as spray, vapor deposition, and so forth, and also by additive manufacturing.

A plurality of film holes 138, 139 can be fluidly coupled to the multiple circuits 128 to provide cooling air onto the exterior of the airfoil 79. It should be understood that film holes can be film cooling exits of any geometry, such as but not limited to holes, shaped holes, and slots.

The multiple circuits 128 each include at least one wall sub-circuit 140 and one skin sub-circuit 142 and are provided with the airfoil 79. It should be understood that while illustrated adjacent the equalizing cavity 124, the multiple circuits 128 can be provided at any location within the interior 134 of the outer wall 95 of the airfoil 79.

Figure 5:
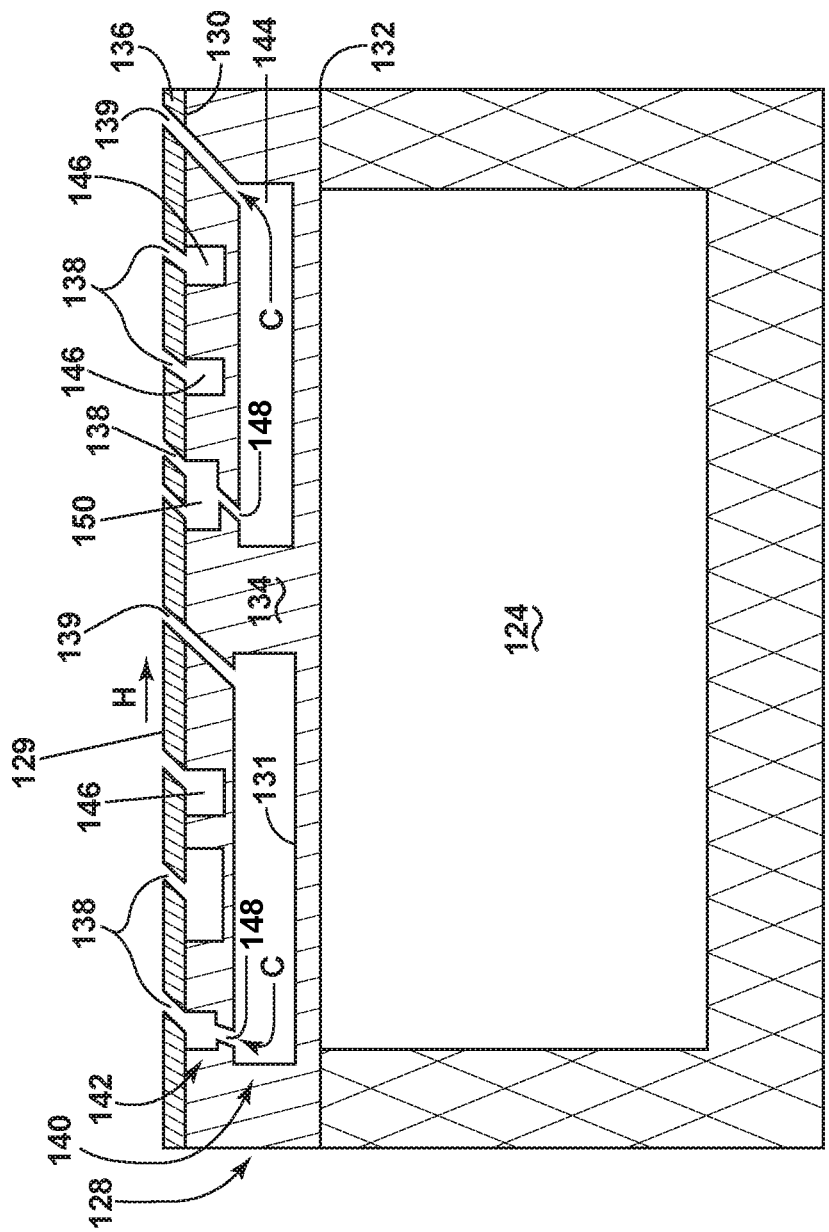
FIG. 5 is a schematic representation of a call out portion of the airfoil of FIG. 4 illustrating a wall sub-circuit, a skin sub-circuit, and an air equalizing cavity.

Referring to FIG. 5, the details of the wall sub-circuit 140 and the skin sub-circuit 142 will be described with respect to this schematic representation of a portion of the airfoil FIG. 4. The skin sub-circuit 142 comprises at least one channel 146 provided in the outer surface 130 and at least one film hole 138 passing through the coating 136 to the channel 146. The skin sub-circuit 142 can be formed in the outer surface 130 or in the coating 136 or formed in a combination of both as illustrated. In some embodiments, a portion of the coating 136 shown could be part of the same substrate that forms the channels 146, and then a coating can be added on top, enclosing the skin cooling circuit 142 with a non-coating material for example with a metal plate that is brazed on or attached to the outer surface. It should be understood that the multiple channels and passages shown are exemplary and not meant to be limiting for example in shape, orientation, or size.

The at least one channel 146 can be multiple channels 146, which are fluidly coupled to each other or fluidly separate from each other. The multiple channels 146 may be arranged in groups, which can be used to form sub-circuits within the skin sub-circuit 142. The multiple channels 146 can vary in width and length. It is further contemplated that multiple film holes 138 can pass through the coating to only one of the multiple channels 146 or to several or all of the multiple channels 146. It should be understood that the multiple channels and passages shown are exemplary and not meant to be limiting for example in shape, orientation, or size.

The wall sub-circuit 140 comprises one or more wall cooling passages 144 provided within the interior 134 of the wall 95 and bounded by the inner and outer surfaces 130, 132 and at least one wall cooling hole 139 passing through the coating 136 and the interior 134 to the wall cooling passage 144. It is further contemplated that multiple wall cooling hole 139 can pass through the coating to the wall cooling passage 144.

An internal hole 148 that can be formed as an aperture or slot, can pass through the interior 134 from at least one of the multiple channels 146 to the wall cooling passages 144 providing a fluid connection between the wall sub-circuit 140 and the skin sub-circuit 142. It can be contemplated that the channels 146 can be of the same or less dimensions as the wall cooling passages 144, and in further embodiments are 50% or less of the wall cooling passages 144.

Figure 6A:
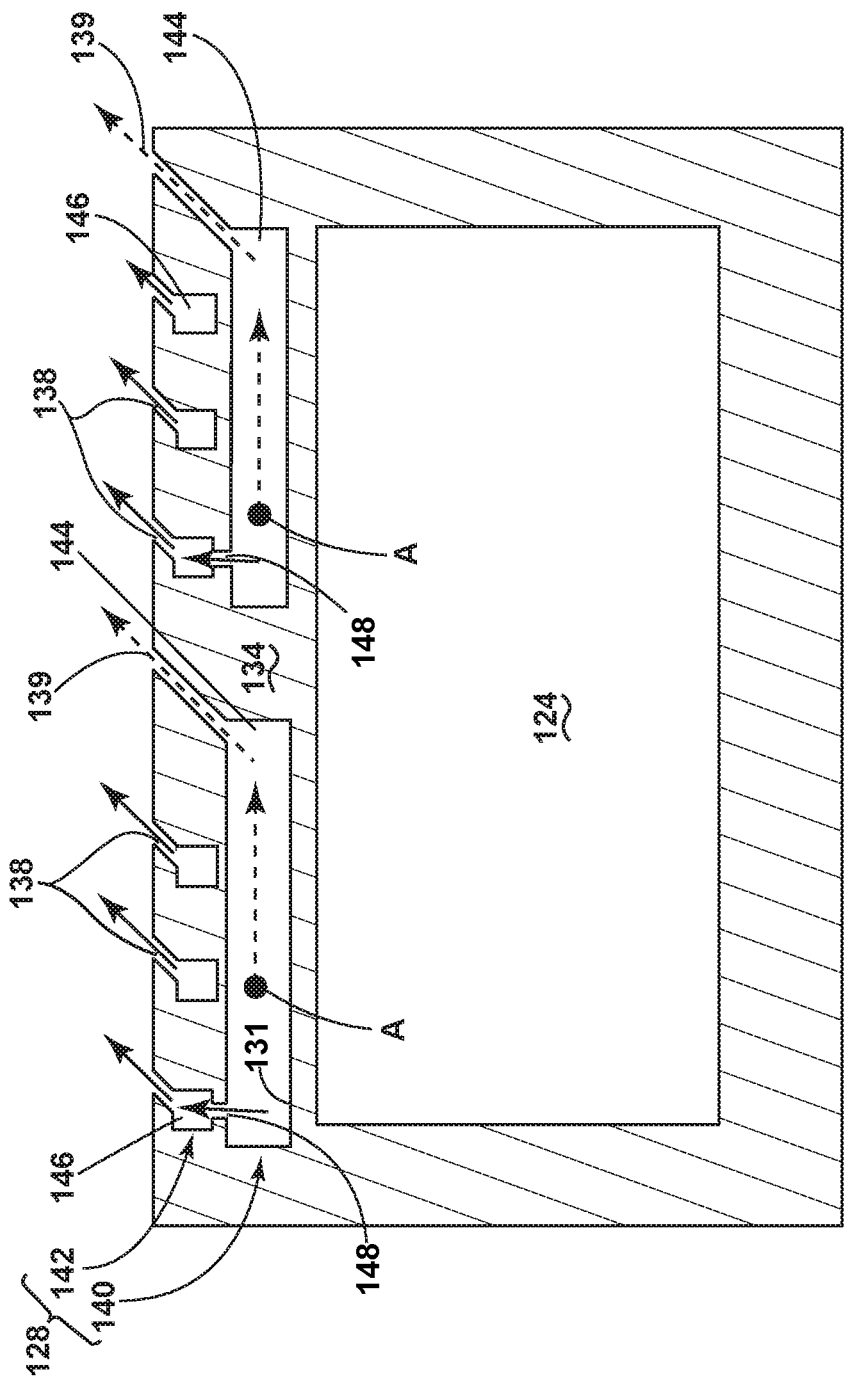
FIGS. 6A and 6B are schematic representations of different flow directions for the wall sub-circuit and skin sub-circuit of FIG. 5.
Figure 6B:
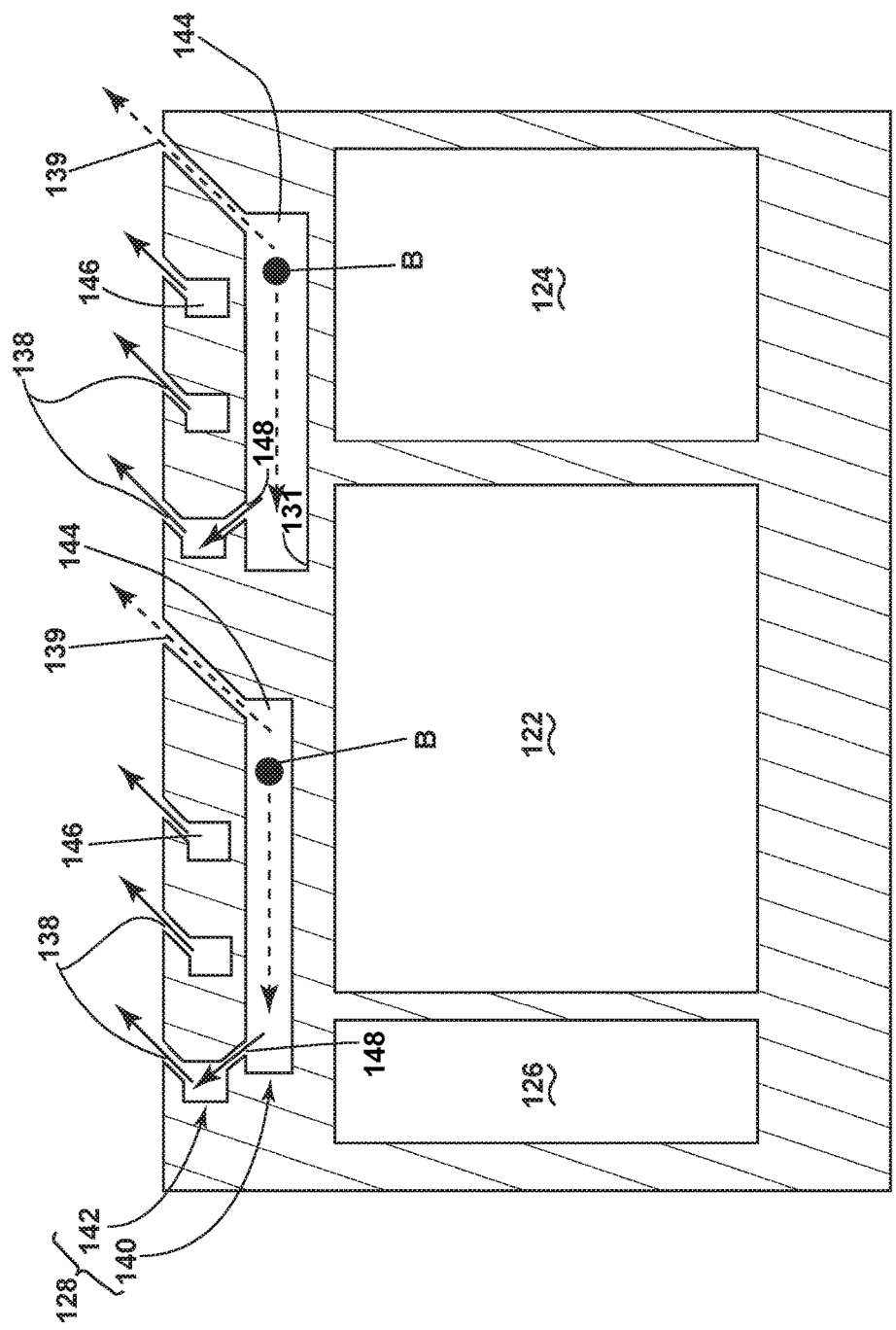

Turning now to FIGS. 6A and 6B, the cooling fluid flow C comprising cooling air is supplied to the wall sub-circuit 140 through the passage outlet 94 coupled to, for example, one of the first, second, or third inlet passages 88, 90, 92. In FIG. 6A, the cooling air is supplied at a first location A within the wall cooling passage 140 wherein the air can flow out of the wall cooling hole 139 as illustrated by the dashed arrows or alternatively through the internal hole 148 and into the skin sub-circuit 142 along one of the channels 146 as illustrated by the solid arrows. The cooling air can flow parallel to each other in each of the two sub-circuits in generally the same direction.

In FIG. 6B, the cooling air is supplied at a second location B within the wall cooling passage wherein the air flowing out of the film hole 138 illustrated by the dashed arrows has a relatively shorter distance to travel when compared to FIG. 6A. The path taken through the internal hole 148 and into the skin sub-circuit 142 along one of the channels 146 as illustrated by the solid arrows is longer than the path illustrated in FIG. 6A and produces parallel cooling air flows in opposite directions.

Adjacent channels in the skin sub-circuits can be fluidly connected to each other (not shown) or to the wall passages for example with a plurality of internal holes 148. Alternatively each of the channels can be part of a serpentine skin sub-circuit where the wall passage orientations and channel orientations are at an angle or perpendicular to each other. Additional configurations can be contemplated as the figures are for illustrative purposes and not meant to be limiting.

Figure 7A:
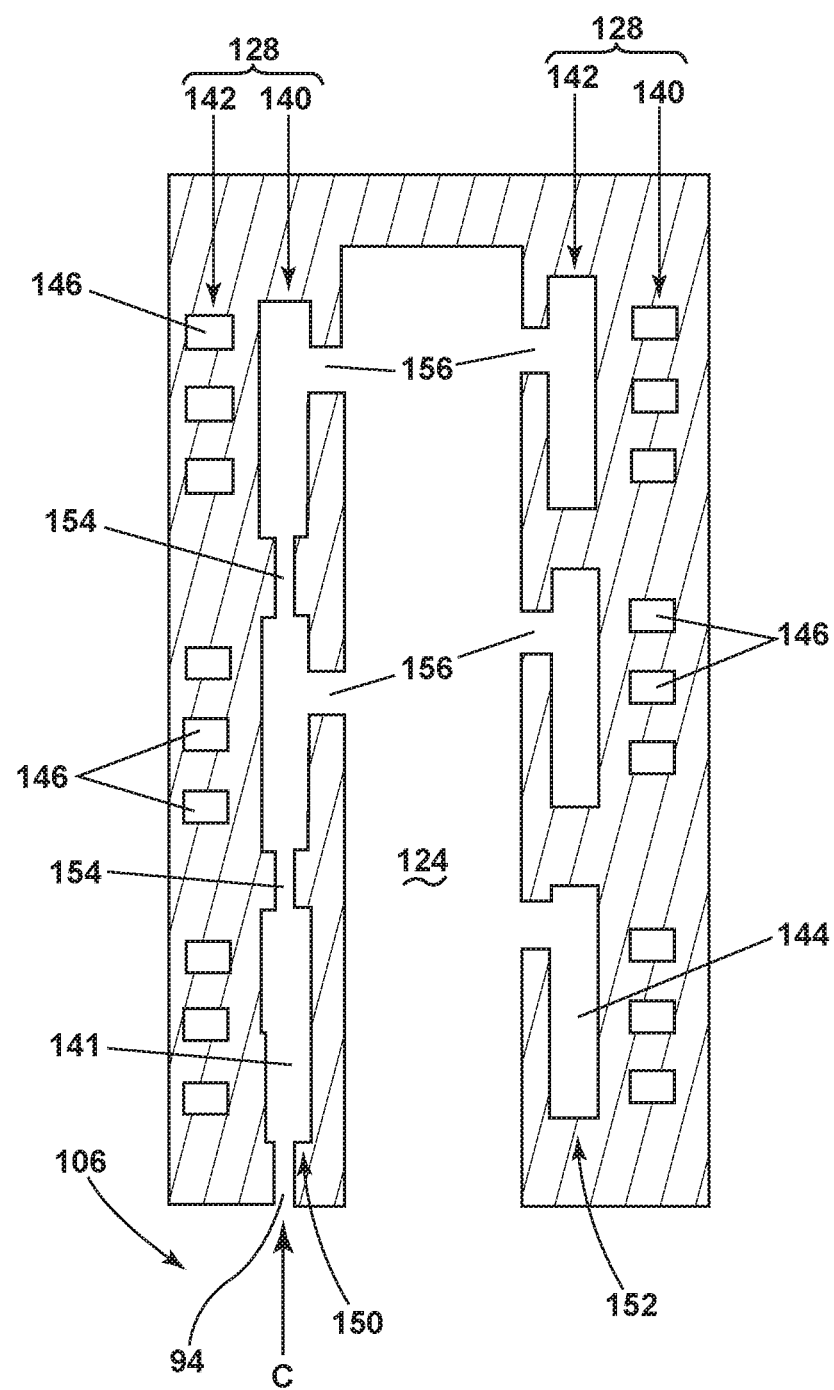
FIG. 7A, 7B, 7C is a cross section schematic representation of the airfoil of FIG. 4 for different configurations of the wall sub-circuit and skin sub-circuit.
Figure 7B:
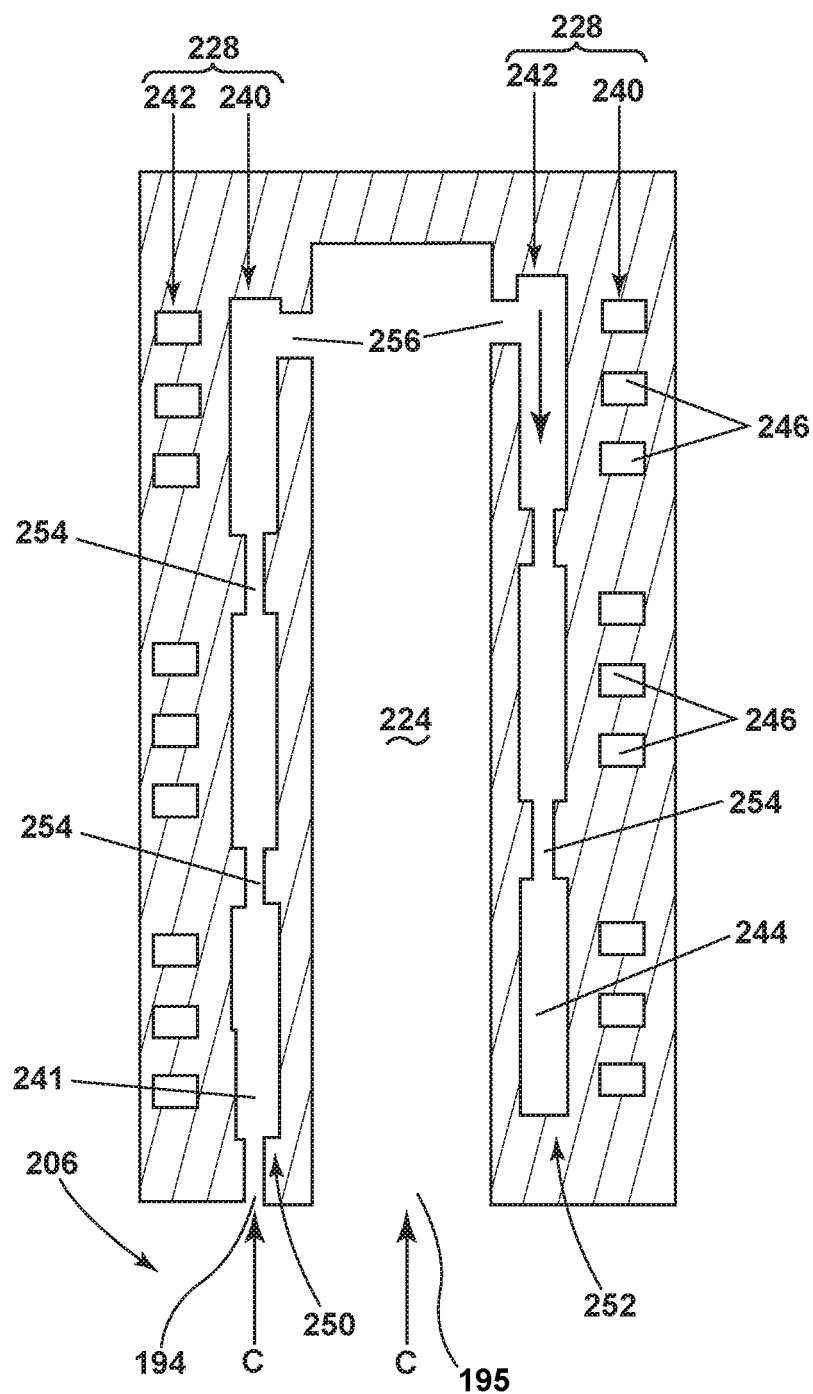
Figure 7C:
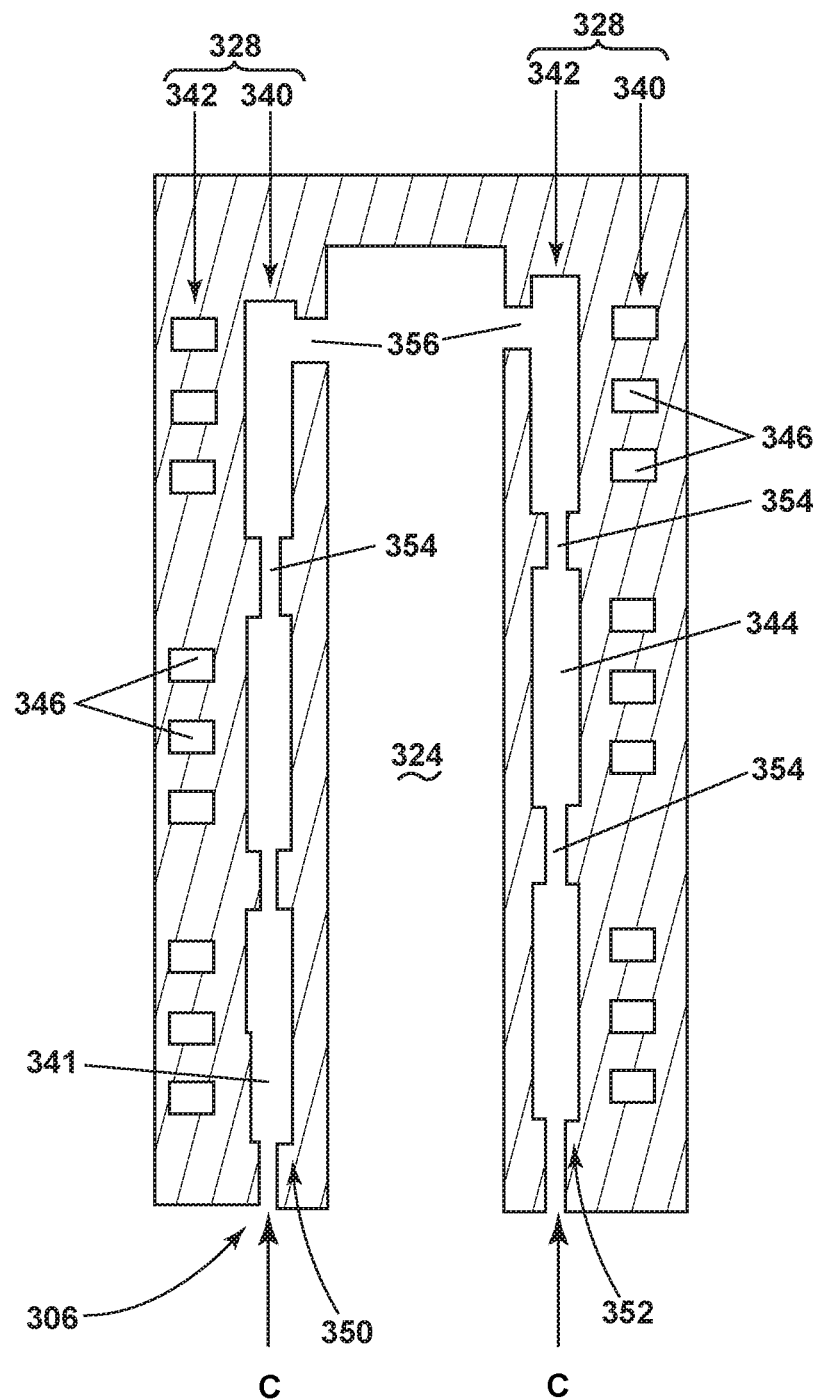

Turning to FIGS. 7A, 7B, and 7C three configurations for supplying cooling air C to the multiple cooling circuits will be discussed. These configurations are similar to each other, therefore, like parts will be identified with like numerals increasing by 100, with it being understood that the description of the like parts of each configuration applies to the additional configurations, unless otherwise noted. It should be understood that the configurations depicted are for illustrative purposes only and not meant to be limiting and that other configurations can be contemplated.

The coupling of at least one of the plurality of wall cooling passages 144 to one of the plurality of equalizing cavities 122, 124, 126 is illustrated. The channels 146, wall cooling passages 144, and equalizing cavities 122, 124, 126 can span part of or the entire airfoil 79 from root 83 to tip 81.

FIG. 7A is a collection of multiple cooling circuits 128 where the cooling air C is supplied to an air supply circuit 106 through the passage outlet 94 to a first group 150 of wall sub-circuits 140 located, for example, on the pressure side 98. The wall sub-circuits 140 in the first group 150 include wall cooling passages 144 that are serially coupled to each other with for example, internal holes 154. A second group 152 located, for example, on the suction side 100 of wall sub-circuits 140 includes wall cooling passages 144 that are also serially coupled. A fluid connection between the first group 150 and second group 152 is formed via the equalizing cavity 124.

While at least one wall sub-circuit 141 proximate the passage outlet 94 remains uncoupled from the equalizing cavity 124, at least one of each of the remaining wall sub-circuits 140 in both the first and second groups 150, 152 can be further coupled to the equalizing cavity 124 with equalizing passages 156, forming multiple fluid connections in parallel between the equalizing cavity 124 and the multiple cooling circuits 128.

FIG. 7B is a collection of multiple cooling circuits 228 where the cooling air C is supplied to an air supply circuit 206 through a passage outlet 194 to a first group 250 of wall sub-circuits 240. An equalizing cavity 224 is additionally supplied with cooling air C through a passage outlet 195. A second group 252 of wall sub-circuits 240 is fluidly coupled to the first group 250 of wall sub-circuits 240 by the equalizing cavity 224.

In this configuration only the wall sub-circuits 243 furthest from the passage outlets 194 and 195 are coupled to the equalizing cavity 224 making the multiple cooling circuits 228 of the second group 252 fluidly coupled in series to the first group 250.

FIG. 7C is similar to the configuration of FIG. 7B, only in this illustration, both a first group 360 of wall sub-circuits 340 and a second group 362 of wall sub-circuits 340 are fluidly connected to an air supply circuit 306.

Equalizing passages 156, 256, 356 should be understood to be of any size and number. These could be of very small size such that they reduce differential pressure loads while flowing little coolant, or of larger size such that they reduce differential pressure loads while flowing more coolant.

A method of cooling the airfoil 79 with the multiple cooling circuits 128 comprises serially passing cooling air C from the wall cooling circuit 140 to the skin cooling circuit 142 for each of the multiple cooling circuits 128 while equalizing the cooling air flow C between the multiple cooling circuits 128 with the equalizing cavity 124.

The method includes supplying the cooling air C to only one of the multiple cooling circuits 128 comprising the wall sub-circuit 141, 241 and then serially supplying the cooling air C to the remaining multiple cooling circuits 128 through the fluid connections 146, 148 illustrated in FIGS. 7A and 7B.

The method also includes equalizing the cooling air C between the multiple cooling circuits 128 at multiple locations 148 provided along the equalizing cavity 124.

The method further includes supplying the cooling air C from the wall cooling passage 144 to the outer surface 130 of the airfoil 79 without passing the cooling air through the channels 146, for example through the wall cooling hole 139, as illustrated in FIG. 6A and FIG. 6B.

It can be contemplated that an entire engine component with multiple wall passages and skin sub-circuits can be cast as a single piece after which molding and reforming portions of the engine component can be implemented and then a coating applied. Additive manufacturing where a main component such as the equalizing cavity is cast and the additional components including the wall passages, fluidly connecting holes, and skin sub-circuits are added can also be contemplated.

The disclosure herein consists of cooled components that utilize both wall sub-circuits and skin sub-circuits through which cooling air flows in parallel and in series and in which the wall sub-circuits receive cooling air from an air supply circuit at the root or tip of the airfoil.

Skin sub-circuits alone can allow up to 30% cooling flow reduction. Benefits to utilizing wall sub-circuits in parallel with skin sub-circuits include increasing thermal uniformity of the substrate structure. In the event that the more at risk skin sub-circuit fails, the parallel wall sub-circuit can still provide thermal and structural integrity to the engine component.

In newer generation turbine cooling 30 to 50% less flow is utilized as compared to prior turbine cooling. Combining the wall sub-circuit with skin sub-circuits enables 30% cooling flow reduction, decreases cost, and decreases specific fuel consumption.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising: an outer wall having an outer surface and an inner surface bounding an interior space, the outer wall defining a pressure side and a suction side extending axially between a leading edge and a trailing edge and extending radially between a root and a tip; at least one coating applied to the outer surface; multiple cooling circuits each comprising at least a wall sub-circuit and skin sub-circuit, with the wall sub-circuit having a wall cooling passage provided within an interior of the outer wall, the skin sub-circuit having at least one channel formed in the outer surface and at least one hole passing through the coating to the at least one channel, with the at least one channel fluidly connected to the wall cooling passage; an air supply circuit comprising a passage outlet fluidly coupled to at least one of the multiple cooling circuits at the root; and at least one equalizing cavity located within the interior and fluidly coupling the multiple cooling circuits; wherein at least some of the wall sub-circuits are fluidly coupled in series, with at least one of the wall sub-circuits fluidly coupled to the equalizing cavity and first and second groups of the wall sub-circuits extend between the root and the tip, with only the first group directly coupled to the air supply circuit at the passage outlet and the second group fluidly coupled by the equalizing cavity to the first group.

2. The airfoil of claim 1 wherein the multiple cooling circuits extend between the root and the tip.

3. The airfoil of claim 2 wherein the at least one equalizing cavity extends between the root and the tip.

4. The airfoil of claim 3 wherein there are multiple fluid connections between the at least one equalizing cavity and the multiple cooling circuits.

5. The airfoil of claim 4 wherein the multiple fluid connections couple the at least one equalizing cavity to at least one wall cooling passage.

6. The airfoil of claim 5 wherein the at least one hole comprises multiple holes passing through to the at least one channel.

7. The airfoil of claim 6 wherein the at least one wall cooling passage comprises multiple wall cooling passages.

8. The airfoil of claim 1 wherein the equalizing cavity is fluidly coupled to the air supply circuit by another passage outlet.

9. The airfoil of claim 1 wherein first and second groups of serially connected wall sub-circuits extend between the root and the tip, with each of the first and second groups fluidly coupled to the air supply circuit and the first and second groups fluidly coupled to the equalizing cavity.

10. The airfoil of claim 1 further comprising a wall cooling hole passing through the coating and fluidly coupled to the wall cooling passage.

11. An engine component for a turbine engine, which generates a hot air flow, and provides a cooling fluid flow, the component comprising: a wall separating the hot air flow from the cooling fluid flow and having a first surface along with the hot air flow in a hot flow path and a second surface facing the cooling fluid flow; at least one coating applied to the first surface; multiple cooling circuits each comprising at least one wall sub-circuit and at least one skin sub-circuit, with the at least one wall sub-circuit having a wall cooling passage provided within an interior of the wall, the at least one skin sub-circuit having at least one channel formed in the first surface and at least one hole passing through the coating to the channel, with the channel fluidly connected to the wall cooling passage; at least one equalizing cavity fluidly coupling the multiple cooling circuits; and a passage outlet for supplying the cooling fluid flow; wherein at least one of the multiple cooling circuits is fluidly coupled to the passage outlet, the at least one wall sub-circuit is arranged in first and second groups of wall sub-circuits, and the passage outlet is directly coupled to only the first group and the second group is fluidly coupled by the equalizing cavity to the first group.

12. The engine component of claim 11 wherein the multiple cooling circuits are fluidly coupled to the cooling fluid flow in one of series or parallel.

13. The engine component of claim 11 wherein there are multiple fluid connections between the at least one equalizing cavity and the multiple cooling circuits.

14. The engine component of claim 11 wherein the at least one channel comprises multiple channels connected to the cooling fluid flow.

15. The engine component of claim 14 wherein the at least one hole comprises multiple holes passing through the coating to the multiple channels.

16. The engine component of claim 14 wherein the wall cooling passage comprises multiple wall cooling passages.

17. The engine component of claim 11 wherein the equalizing cavity is fluidly coupled to the cooling fluid flow by another passage outlet.

18. The engine component of claim 11 further comprising a wall cooling hole passing through the coating and fluidly coupled to the wall cooling passage.

* * * * *